(12) United States Patent
Wieczorek

(10) Patent No.: US 10,761,325 B1
(45) Date of Patent: *Sep. 1, 2020

(54) VIRTUAL REALITY DEVICES AND ACCESSORIES

(71) Applicant: Mark D. Wieczorek, San Diego, CA (US)

(72) Inventor: Mark D. Wieczorek, San Diego, CA (US)

(73) Assignee: MARK D. WIECZOREK, P.C., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,958

(22) Filed: May 14, 2020

Related U.S. Application Data

(63) Continuation of application No. 16/785,970, filed on Feb. 10, 2020, now Pat. No. 10,690,913, which is a continuation of application No. 16/382,448, filed on Apr. 12, 2019, now Pat. No. 10,558,042, which is a continuation of application No. 14/669,744, filed on Mar. 26, 2015.

(60) Provisional application No. 61/970,512, filed on Mar. 26, 2014.

(51) Int. Cl.
*G02B 27/01* (2006.01)
*A63F 13/00* (2014.01)

(52) U.S. Cl.
CPC ............ *G02B 27/017* (2013.01); *A63F 13/00* (2013.01); *G02B 2027/0138* (2013.01)

(58) Field of Classification Search
None
See application file for complete search history.

(56) References Cited

U.S. PATENT DOCUMENTS

| | | |
|---|---|---|
| 5,872,438 A | 2/1999 | Roston |
| 6,695,770 B1 | 2/2004 | Choy |
| 2005/0116954 A1 | 6/2005 | Ripps |
| 2006/0015560 A1 | 1/2006 | MacAuley |
| 2006/0262120 A1 | 11/2006 | Rosenberg |
| 2007/0186007 A1 | 8/2007 | Field |
| 2008/0081701 A1 | 4/2008 | Shuster |
| 2008/0294663 A1 | 11/2008 | Heinley |
| 2011/0082009 A1 | 4/2011 | Ranky |
| 2012/0226987 A1 | 9/2012 | Wie |
| 2013/0271457 A1 | 10/2013 | Haswell |
| 2014/0046829 A1 | 2/2014 | Serban |

(Continued)

OTHER PUBLICATIONS

Loral; "Tip of the Week-Raiding in EverQuest—Jul. 3, 2007"; Jul. 3, 2007; all pages; https://www.everquest.com/news/imported-eq-enus-50487.

*Primary Examiner* — Peter Hoang
(74) *Attorney, Agent, or Firm* — Mayer & Williams PC

(57) ABSTRACT

Systems and methods disclosed provided a virtual reality experience, including: a set of motorized pads for coupling to feet of a user; a means of communication between the set of motorized pads and a computing environment operating a virtual reality headset; such that the set of motorized pads are configured to provide pressure on a user's feet as an avatar within a virtual environment traverses the environment. Systems and methods disclosed further provide a multiuser virtual reality experience. Systems and methods disclosed further provide a multiuser experience including generation of a common environment viewable in the virtual reality headsets; and recording a tour including audio data as the first user describes the common environment.

30 Claims, 4 Drawing Sheets

(56) References Cited

U.S. PATENT DOCUMENTS

2014/0063061 A1 3/2014 Reitan
2014/0306866 A1 10/2014 Miller

VIRTUAL REALITY DEVICES AND ACCESSORIES

CROSS-REFERENCE TO RELATED APPLICATIONS

This application is a continuation of U.S. application Ser. No. 16/785,970, filed Feb. 10, 2020, which is a continuation of U.S. application Ser. No. 16/382,448, filed Apr. 12, 2019 (now U.S. Pat. No. 10,558,042, issued Feb. 11, 2020), which is a continuation of U.S. patent application Ser. No. 14/669,744, filed Mar. 26, 2015 which claims the benefit of priority of U.S. Provisional Patent Application Ser. No. 61/970,512, filed Mar. 26, 2014, entitled "VIRTUAL REALITY DEVICES AND ACCESSORIES", owned by the owner of the present application and herein incorporated by reference in its entirety.

BACKGROUND

Virtual Reality (VR) headsets, such as the Oculus Rift®, are poised to become a significant new factor in computer environments, including gaming, virtual tourism, and the like. However, the same also present a number of challenges. Consequently, there is a need for improvements in VR headsets and accessories.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The above needs are met in various ways by systems and methods according to present principles.

In one aspect, the invention is directed towards a system for providing a virtual reality experience, including: a set of motorized pads for coupling to respective feet of a user; a means of communication between the set of motorized pads and a computing environment operating a virtual reality headset; such that the set of motorized pads are configured to provide pressure on a user's feet as an avatar within a virtual environment traverses the environment.

Implementations of the invention include one or more of the following. The means of communication may be an RF link or a wired link. The avatar may be a player character in a videogame or a character in a virtual tour. The set of motorized pads may include a left pad and a right pad, corresponding to a user's left foot and right foot, and the set of motorized pads may be configured to provide pressure on the user's left foot as an avatar within the virtual environment steps down on the environment with their left foot, and where the motorized pads may further be configured to provide pressure on the user's right foot as an avatar within the virtual environment steps down on the environment with their right foot.

In another aspect, the invention is directed towards a method of providing a multiuser virtual reality experience, including: configuring a server to communicate with a first user computing environment, the first user computing environment coupled to a first virtual reality headset, the first user computing environment configured to generate a first avatar corresponding to the user, the first avatar situated within a common environment viewable in the first virtual reality headset; and configuring a server to communicate with a second user computing environment, the second user computing environment coupled to a second virtual reality headset, the second user computing environment configured to generate a second avatar corresponding to the user, the second avatar situated within the common environment viewable in the second virtual reality headset.

Implementations of the invention may include one or more of the following. The method may further include configuring the server to allow the first user to provide a tour to the second user. The configuring the server to allow the first user to provide a tour to the second user may include configuring the server to cause the second avatar to automatically follow the first avatar as the first avatar moves within the common environment. The server may be a social networking server. For example, where the server is a server of a social networking site, the same may allow the first user to indicate entries on a social networking page corresponding to the first user, and to provide audio commentary before, during, or after, the indication. The tour and the audio commentary may be recorded for later playback. The indication of entries may be via the first avatar pointing at an asset corresponding to the entry. The entries may include textual entries, audio entries, photographic entries, or video entries. The method may further include receiving an asset from a third-party source distinct from the social networking page corresponding to the first user, and configuring the server to allow the tour to include the received asset.

In another aspect, the invention is directed towards a non-transitory computer readable medium, including instructions for causing a computing environment to perform the above method.

In another aspect, the invention is directed towards a method of providing a multiuser virtual reality experience, including: configuring a server to communicate with a first user computing environment, the first user computing environment coupled to a first virtual reality headset, the first user computing environment configured to generate a common environment viewable in the first virtual reality headset; and recording a tour including audio data as the first user describes the common environment.

Implementations of the invention may include one or more of the following. The server may be a server of a social networking site, and the common environment may include visual depictions of entries from a social networking page corresponding to the first user, and the method may further include configuring the server to allow the first user to indicate the entries and to provide audio commentary before, during, or after, the indication.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

VR headsets, while providing high degrees of immersion, can also be very disorienting to a user. Accordingly, it can be helpful to users to have player character (PC) avatars move at a slow rate through the online environment. If a game or online environment is designed for VR, then the PC speed within the environment can be designed to be slow or below a predetermined threshold, e.g., less than 5 mph or 10 mph as measured within the online environment. If the game environment or game application is being retrofitted for VR, then the PC speed can be slowed down to the levels described.

Another disorienting aspect is that one typically games or performs virtual tourism while sitting down, while the PC is walking around within the online environment. This can be disorienting too, if for no other reason than the height differential between standing and sitting.

Figure 1:
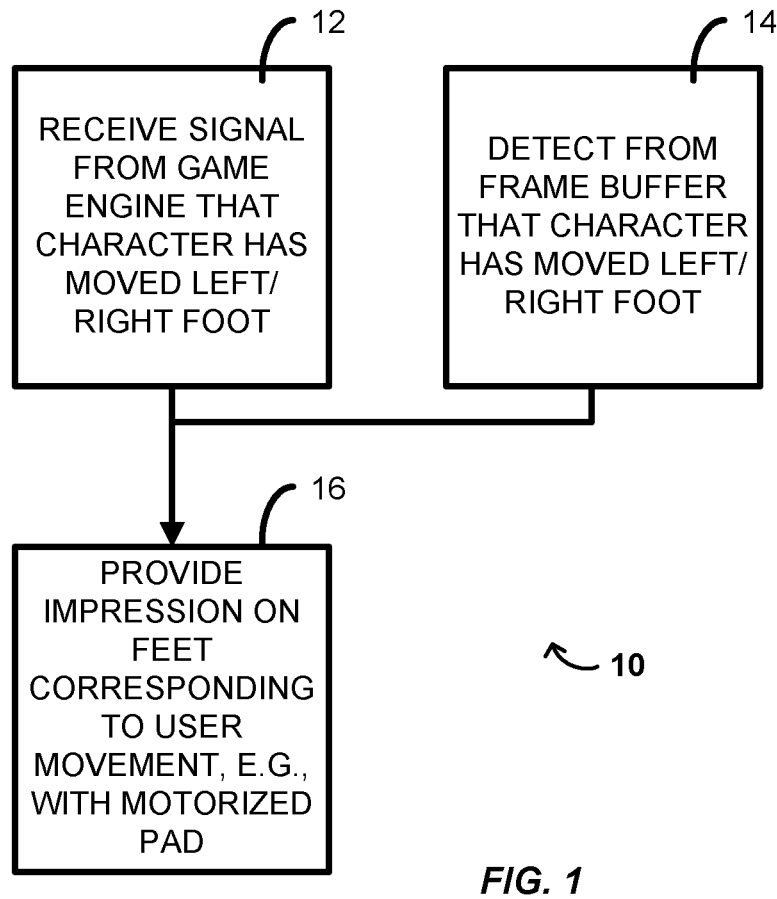
FIG. 1 is a flowchart of a method according to present principles.
Figure 2:
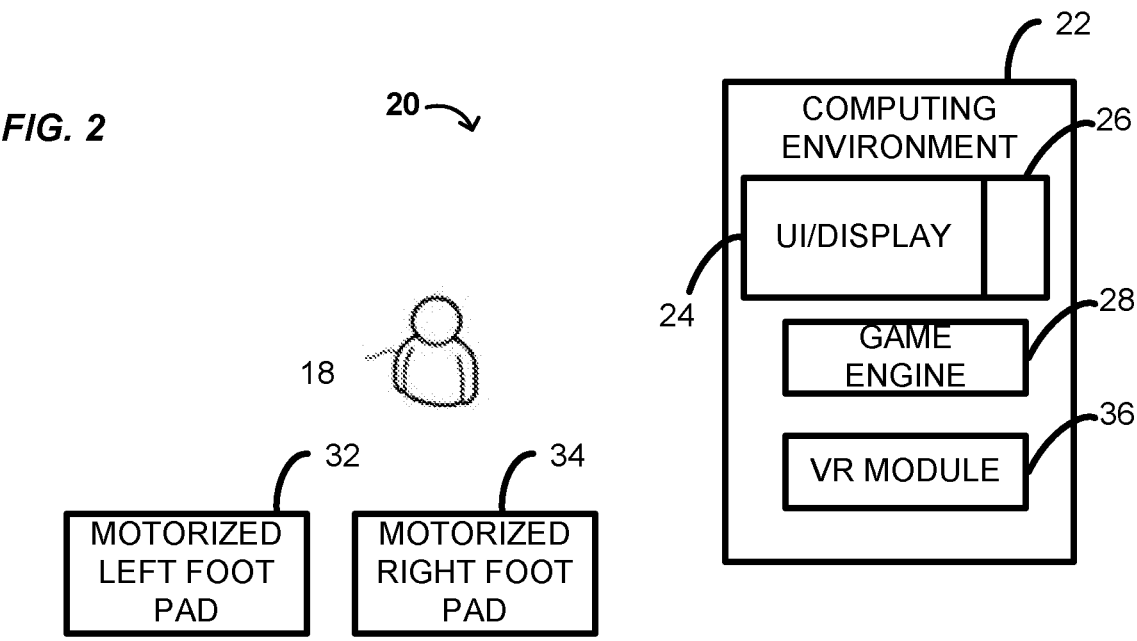
FIG. 2 is a schematic illustration of a system according to present principles.

Various solutions are available. In one implementation, and referring to the flowchart 10 of FIG. 1 and the schematic diagram of the system 20 of FIG. 2, motorized pads 32 and 34 may be placed on the feet of a user 18 and interfaced with the game engine 28 running on a computing environment 22. Alternatively, a frame buffer 26 may read the display 24 and estimate when character appendages (responsible for movement) are striking a surface. The estimation may be performed by a VR module 36 running on the computing environment, or alternatively the VR module may run within a VR headset. When the user walks through the environment, the motorized pads sequentially push up on the pads of the feet of the wearer. The interfacing may be, but is not limited to be, such that when the PC's left foot makes a step in the online environment, the left motorized pad is activated. When the PC's right foot makes a step, the right motorized pad is activated. Speed changes may be recognized, as can force with which a foot strikes the surface, e.g., whether the user is walking delicately or running hard. Standing in place can be simulated by relatively constant pressure on each foot (leaning may also be accommodated). The motorized pads may be conveniently disposed on a surface on which a user rest their feet, or within footwear.

In one method, a signal may be received from the game engine that a character is moving (step 12), and in some cases the signal may even indicate whether a left foot or right foot is currently moving. In some cases the movement, and/or a particular appendage moving, may be detected using a frame buffer analyzing the display (step 14). A VR module, or other input/output module within the game, may then provide an impression on the feet of the user corresponding to the movement of the player character within the game or other virtual environment (step 16). Such an impression may be performed using, e.g., a motorized pad.

It is noted that the accuracy of the motorized pads need not be perfect. So long as the user generally feels forces against their feet, the immersion may be maintained.

Figure 3:
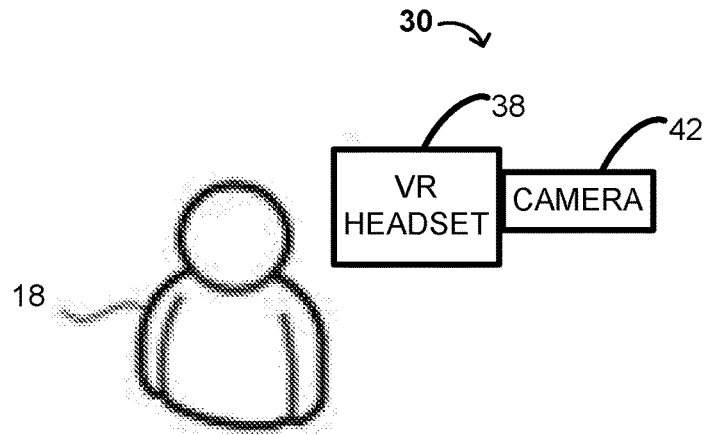
FIG. 3 is another schematic illustration of a system according to present principles.

Another disorienting factor comes from the lack of vision outside of the VR headset, and in particular the aspect that if a user moves their hands up in front of their face, they do not see their hands. While several hand and body sensors exist and can be used to detect when hands should be rendered, such as generally complicated and too expensive for most users. Accordingly, in a system 30 illustrated in FIG. 3, a simple low resolution camera 42, mounted on the VR headset 38, may be employed to detect the approximate position of the user's hands and feed the same into the game engine to allow for the rendering of "approximate" versions of the user's hands.

Various benefits inure to such systems. First, the system may scale to higher resolutions as cameras become higher resolution, cheaper, and lighter (weight is an important factor for inclusion onto a headset). Camera position on a headset is convenient for visualization as there is unity in that what the camera sees is the same as what the user would expect to view from their eye position within the headset.

Figure 4:
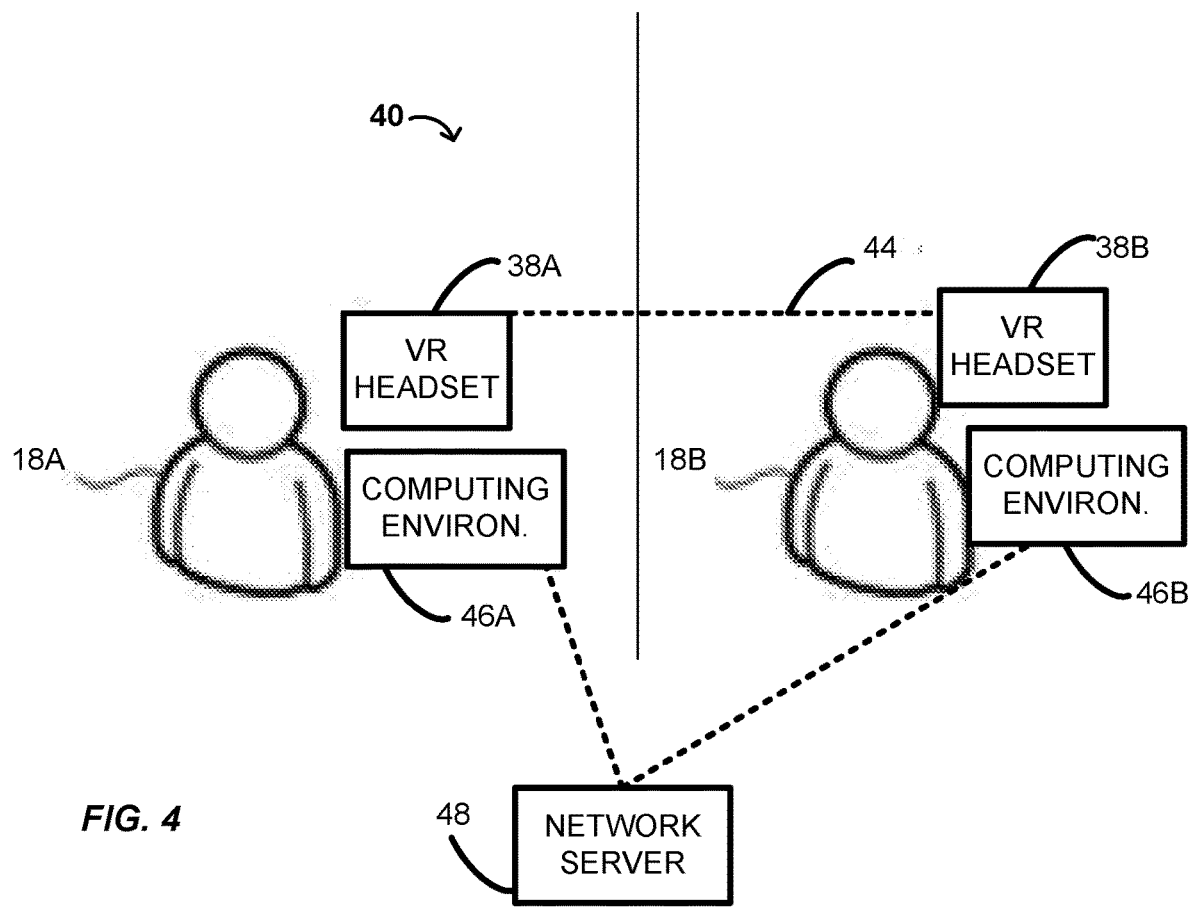
FIG. 4 is another schematic illustration of a system according to present principles.

Another important application concerns multiplayer uses. In particular, and referring in particular to the system 40 depicted in FIG. 4, two users 18A and 18B may each have a respective VR headset 38A and 38B and may be in data communication with each other via a communications link 44, e.g., over the Internet, Bluetooth, LAN, WLAN, cellular communications, NFC, or any other sort of communications technology existing now or developed later. The client application on each person's system, e.g., computing environments 46A and 46B, respectively, which control operations on VR headsets 38A and 38B, may be a thin client or a substantial one. It is noted here that the headsets 38A and 38B may also be embodied by augmented reality (AR) headsets as well. In addition, the headsets may well incorporate all the computing functionality needed to perform the applications described here; this may be particularly true as processor power continues to increase along with miniaturization. The systems and methods according to present principles may work well with both types of systems.

Alternatively, the client systems may communicate via a web application or a hybrid system where one user employs a standalone client and another a web application. The web application or standalone client may form a portion of a network such as a social network where communications occur over one or more network servers 48. For example, a Facebook® application may employ VR headsets and users may be thereby enabled to communicate with each other. In this system, where previously members would communicate with each other via Facebook video or voice chatting, a VR communication application may advantageously take advantage of the virtual reality SDK, e.g., Oculus Rift® SDK, to perform similar functionality.

However, in systems and methods according to current principles, users may go far beyond just seeing each other. For example, each user may have associated therewith an avatar, and various levels of avatar customization can be allowed. In some cases, a selection of hair lengths, hair colors, facial shapes, skin colors, body types, heights, eye colors, and the like, may be employed to allow customization of an avatar. In more advanced implementations, users may be permitted to submit photographs of their head or their entire body to allow a three-dimensional reconstruction of the same to be created and employed in the simulation.

In a particular implementation of a VR simulation within a social network, a "page tour" functionality is enabled where users can give tours of their social networking page to a friend or other reviewer. Users may even record (within the application) a video of such tours, so that others may be enabled to view the recorded tour at their convenience. In a page tour, a first user leads a second user on a tour of the events chronicled on the first user's social networking page. For example, the users may appear to walk down a timeline, with various pictures at respective various locations in time. The first user may point out aspects of the photos or videos to the second user, and one or both users may "teleport" to other pages by following links on the first user's social networking page. For example, if in the past the first user "checked in" at the Eiffel Tower in France, and the first user was giving a tour including that check in to a second user, the first user (or the second user) may click on a link to view a third-party three-dimensional reconstruction of the Eiffel Tower, so as to allow the first user to give a tour of the Eiffel Tower to the second.

In the same way, the first user may "teleport" to a relative's page to point out various family members or the like.

Other variations will also be understood. For example, the background of the virtual reality seen may not be just "black" or static. For example, if the first user is giving a tour of friends to a second user, French scenes may provide a backdrop, and French music may be played as an audio file.

Figure 5:
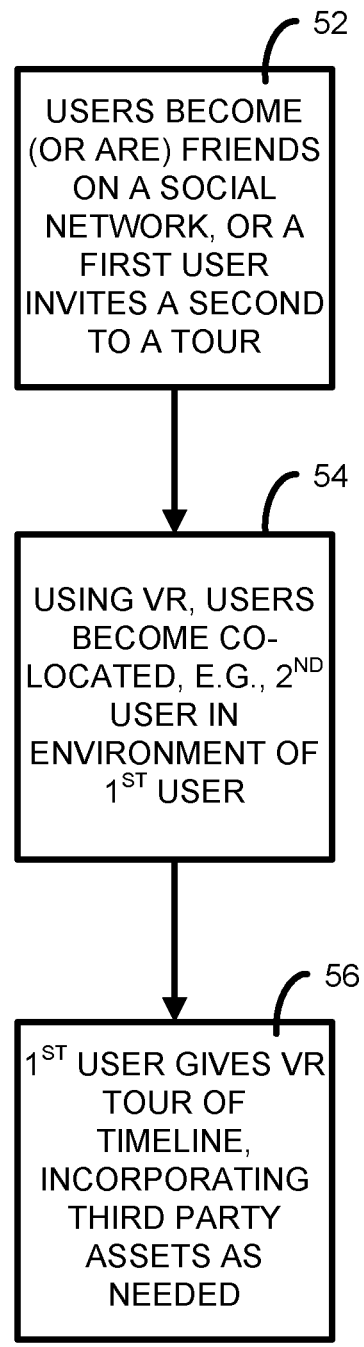
FIG. 5 is another flowchart of a method according to present principles.

In a general implementation, as shown in the flowchart 50 of FIG. 5, a first step is that users become (or already are) friends on a social network, or are otherwise associated within a network, such that a second user is allowed to view aspects and personal information of the first user (step 52). Alternatively, a first user may invite the second user to a tour.

Using virtual reality or augmented reality, the users become co-located (step 54), such that each can see the other, e.g., via the avatars described above, or in other ways. The first user then commences to give a virtual reality tour of the assets available to them, e.g., on a Facebook timeline (step 56). As noted, third-party assets may be incorporated if desired, e.g., to give a virtual tour of the Eiffel tower.

The tour may be in real-time, with both users using virtual reality headsets at the same time, or the first user may record their tour for playback in virtual reality to one or more other users at a later time. For example, such may afford the opportunity for a first user to record a life tour for playback to relatives, friends, and loved ones, e.g., as part of a genealogical history or autobiography. The same may be used in hospice situations to record a life history. The same may also form part of an ongoing VR journal.

Figure 6:
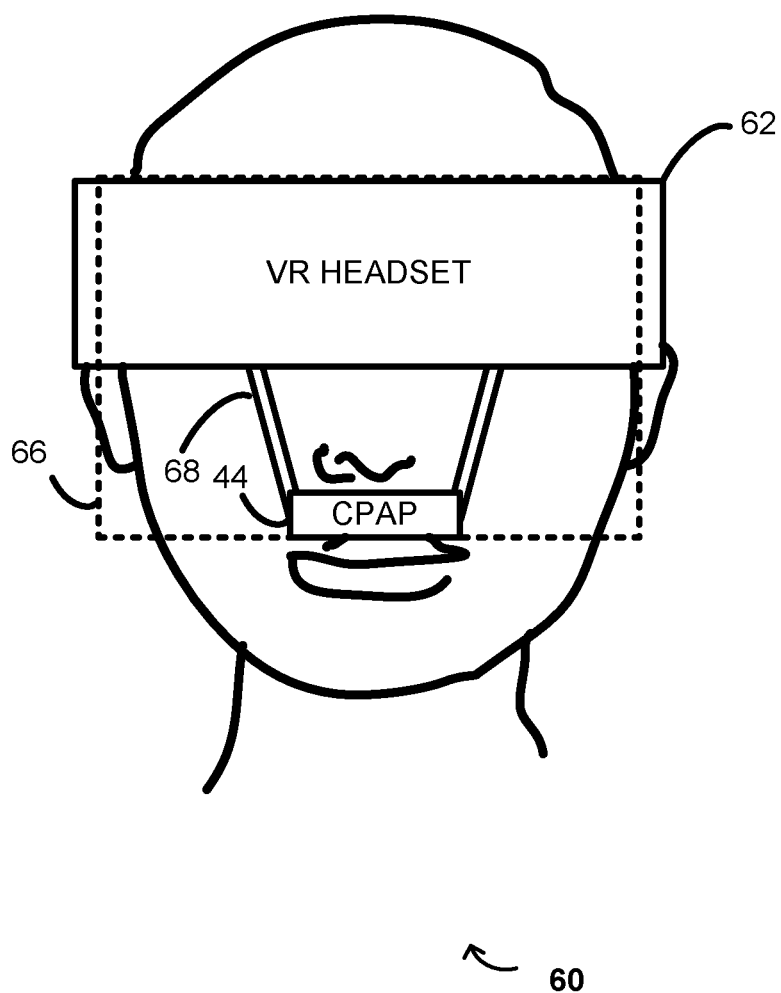
FIG. 6 is another schematic illustration of a system according to present principles.

Other variations will also be understood. For example, and referring to the system 60 of FIG. 6, the immersive headsets described above may advantageously be combined with CPAP machines. In particular, CPAP machines are known to have a low degree of patient compliance because of their uncomfortable character. However, if the VR headset is made large enough, e.g., to envelop the user's nose, as illustrated in the implementation 66, an oxygen supply can be directed through nozzles into the user's nose, performing a positive pressure process, and accomplishing the goals of prior CPAP machines. Alternatively, nozzles 44 may be coupled to the headset 62 but located exterior thereof, e.g., below the headset via pressure hoses 68, so as to allow engagement or positioning adjacent the nasal canal of a user. In use, the same method is performed, with the nozzles directing a positive flow of air or oxygen into the nose of the patient, allowing positive pressure, and accomplishing the goal of prior CPAP machines.

Other variations will also be understood. For example, while VR devices have been disclosed, systems and methods according to present principles may also be implemented within the context of AR devices.

In addition, it is noted that systems and methods according to present principles can generally not be performed without an appropriate computing environment configured to perform the steps disclosed here. In addition, by performing the steps as described, the computing environment is able to operate in a more efficient manner than virtual reality or augmented reality systems of the prior art.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where movements and actions within a virtual reality environment are contemplated, the plural inputs may allow plural users to input relevant data at the same time.

What is claimed is:

1. A non-transitory computer-readable medium, comprising instructions for causing one or more network servers to perform a method of operating a multiuser virtual or augmented reality environment, comprising:

establishing communications between one or more network servers and a first virtual or augmented reality headset, the first virtual or augmented reality headset having a first virtual or augmented reality display and being coupled to a first user computing environment;

establishing communications between the one or more network servers and a second virtual or augmented reality headset, the second virtual or augmented reality headset having a second virtual or augmented reality display and being coupled to a second user computing environment; and operating the one or more network servers using inputs from the first and second user computing environments to cause:

a display of a common environment in the first virtual or augmented reality display;

a display of the common environment in the second virtual or augmented reality display;

a display of entries associated with a social networking page corresponding to a first user at least in the first virtual or augmented reality display; and a display of an asset corresponding to a selected entry among the entries, the asset displayed in the common environment, including in the first and the second virtual or augmented reality displays.

2. The medium of claim 1, wherein the first or second user computing environments are integrated in the first or second virtual or augmented reality headsets, respectively.

3. The medium of claim 1, wherein the first virtual or augmented reality headset is a first virtual reality headset having a first virtual reality display, and wherein the first user computing environment is configured to receive input from a camera associated with the first user computing environment, the camera on the first virtual reality headset, the camera imaging first user hand position data, and wherein the first user computing environment is configured to use input from the camera to display virtual user hands in the first virtual reality display.

4. The medium of claim 1, wherein the entries associated with a social networking page are displayed as part of a display of the social networking page.

5. The medium of claim 1, wherein the first user computing environment and the first virtual or augmented reality display, or the second user computing environment and the second virtual or augmented reality display, or both, are configured to display an avatar associated with a first or second user, respectively, within the common environment, and wherein the method further comprises:

receiving customization of the respective avatar from the respective user using the respective user computing environment, the customization with regard to at least one of avatar hair color, hair shape, face shape, or body shape; or receiving an input of a computer-generated head or body as a portion of the respective avatar.

6. The medium of claim 1, wherein the method further comprises receiving input from the first user using a pointing device coupled to the first user computing environment, and causing a display of an indication of the pointing device in the common environment.

7. The medium of claim 1, wherein the entries are associated with a timeline on the social networking page, and wherein the entries corresponding to the timeline include a plurality of visual depictions at locations in the first virtual or augmented reality display, in the second virtual or augmented reality display, in the common environment, or in a combination of these.

8. The medium of claim 1, wherein the method further comprises receiving an asset from a third-party source distinct from the social networking page corresponding to the first user, and displaying the received asset in the first virtual or augmented reality display, in the second virtual or augmented reality display, in the common environment, or in a combination of these.

9. The medium of claim 1, wherein the method further comprises causing a display of a page in the common environment associated with the entry when a user activates a link associated with the entry, and wherein the link corresponds to a check in on the social networking page corresponding to the first user.

10. The medium of claim 1, wherein the method further comprises playing back audio during the display of the common environment.

11. The medium of claim 1, wherein the method further comprises providing an invitation functionality, such that the first user can invite a second user to the common environment.

12. The medium of claim 1, wherein the entries include visual depictions, and wherein the visual depictions include images, textual entries, audio entries, or video entries.

13. A virtual or augmented reality headset, comprising:

a first virtual or augmented reality display, the first virtual or augmented reality display configured to be coupled to a first user computing environment; and a non-transitory computer-readable medium comprising instructions for causing the first user computing environment to:

receive, from one or more network servers, common environment data, and display the common environment in the first virtual or augmented reality display;

receive, from the one or more network servers, data from a different virtual or augmented reality headset that is also displaying a view of the common environment;

receive, from the one or more network servers, data corresponding to entries associated with a social networking page of a user of the first virtual or augmented reality headset;

display an indicator of the entries associated with the social networking page corresponding to the first user, at least in the first virtual or augmented reality display; and display a selected entry of the entries associated with the social networking page corresponding to the first user, in the first virtual or augmented reality display and in the different virtual or augmented reality display, wherein the common environment data and the selected entry are displayed on the first virtual or augmented reality display at substantially the same time they are displayed by the different virtual or augmented reality headset.

14. The headset of claim 13, wherein the first user computing environment is integrated in the virtual or augmented reality headset.

15. The headset of claim 13, wherein the virtual or augmented reality headset is a first virtual reality headset and the first virtual or augmented reality display is a first virtual reality display, and further comprising a camera associated with the first user computing environment, the camera mounted on the first virtual reality headset, the camera imaging first user hand position data, and wherein the instructions further cause the first user computing environment to use data from the camera to display virtual user hands in the first virtual reality display, in the common environment, or both.

16. The headset of claim 13, wherein the entries associated with the social networking page are displayed as part of a display of the social networking page.

17. The headset of claim 13, wherein the instructions further cause the first user computing environment and the virtual or augmented reality display to display an avatar associated with a first user within the common environment, and wherein the one or more network servers are further configured to:
- receive customization of the avatar from the first user using the first user computing environment, the customization with regard to at least one of avatar hair color, hair shape, face shape, or body shape; or
- receive an input of a computer-generated head or body as a portion of the respective avatar.

18. The headset of claim 13, wherein the instructions further cause the first user computing environment to receive input using a pointing device coupled to the first user computing environment, and causing a display of an indication of the pointing device at least in the first virtual or augmented reality display or in the common environment or both.

19. A non-transitory computer-readable medium, comprising instructions for causing a first user computing environment to perform a method, comprising:
- displaying a common environment in a first virtual or augmented reality display;
- communicating with one or more network servers, the one or more network servers configured to communicate with a plurality of other user computing environments;
- displaying entries associated with a social networking page corresponding to a first user in the first virtual or augmented reality display,
- wherein at least some of the other user computing environments are coupled to respective virtual or augmented reality displays, and wherein the other user computing environments are configured to display respective views of the common environment in the respective virtual or augmented reality displays, and wherein the other user computing environments are further configured to display the entries associated with the social networking page in the respective virtual or augmented reality displays or an indication of a selected one of the entries, the entry selected using the first user computing environment.

20. The medium of claim 19, wherein the first user computing environment is integrated in the first virtual or augmented reality headset.

21. The medium of claim 19, wherein the first virtual or augmented reality headset is a first virtual reality headset having a first virtual reality display, and the method further comprises receiving input from a camera associated with the first user computing environment, the camera on the first virtual reality headset, the camera imaging first user hand position data, and using the first user hand position data from the camera to display virtual user hands in the first virtual reality display.

22. The medium of claim 19, wherein the entries associated with a social networking page are displayed as part of a display of the social networking page.

23. The medium of claim 19, wherein the medium is such that the first user computing environment and the first virtual or augmented reality display are configured to display an avatar associated with a first user within the common environment, and further comprising causing the one or more network servers to:
- receive customization of the first avatar from the first user using the first user computing environment, the customization with regard to at least one of avatar hair color, hair shape, face shape, or body shape; or
- receive an input of a computer-generated head or body as a portion of the first avatar.

24. The medium of claim 19, wherein the method further comprises receiving input from a pointing device coupled to the first user computing environment, and causing a display of an indication of the pointing device in the common environment in the first virtual or augmented reality display or in the common environment or both.

25. A system for operating a multiuser virtual or augmented reality environment, comprising:
- a first virtual or augmented reality display and a first virtual or augmented reality headset housing the first virtual or augmented reality display, the first virtual or augmented reality display configured to be coupled to a first user computing environment, the first user computing environment configured to communicate with one or more network servers;
- a second virtual or augmented reality display and a second virtual or augmented reality headset housing the second virtual or augmented reality display, the second virtual or augmented reality display configured to be coupled to a second user computing environment, the second user computing environment configured to communicate with the one or more network servers;
- a server non-transitory computer-readable medium within the one or more network servers, comprising instructions for causing the one or more network servers to perform a method comprising:
- establishing communications between the one or more network servers and the first user computing environment, and establishing communications between the one or more network servers and the second user computing environment;
- causing the display of a common environment in the first and second virtual or augmented reality displays; and
- causing the display of entries associated with a social networking page corresponding to the first user at least in the first virtual or augmented reality display, and causing the display of an indicator of a selected one of the entries in the first and second virtual or augmented reality displays.

26. The system of claim 25, wherein the first or second user computing environments are integrated in the first or second virtual or augmented reality headsets, respectively.

27. The system of claim 25, wherein the first virtual or augmented reality headset is a first virtual reality headset having a first virtual reality display, the first virtual reality headset further including a camera, and wherein the first user computing environment is configured to receive input from the camera, the camera imaging first user hand position data, and is further configured to use the received input from the camera to display virtual user hands in the first virtual reality display.

28. The system of claim 25, wherein the causing the display of entries associated with a social networking page includes causing the display of the social networking page with the entries thereon.

29. The system of claim 25, wherein the first user computing environment and the first virtual or augmented reality display, or the second user computing environment and the second virtual or augmented reality display, or both, are configured to display an avatar associated with a first or second user, respectively, within the common environment, and wherein the method further comprises:
- receiving customization of the respective avatar from the respective user using the respective user computing environment, the customization with regard to at least one of avatar hair color, hair shape, face shape, or body shape; or receiving an input of a computer-generated head or body as a portion of the respective avatar.

30. The system of claim 25, wherein the first or second user computing environments are further configured to cause the respective user computing environment to receive input using a pointing device coupled to the respective user computing environment, and to cause a display of an indication of the pointing device in the common environment.

\* \* \* \* \*